June 24, 1924.　　　　　　　　　　　　　　　　　1,498,769
H. A. W. WOOD
METHOD OF CONSTRUCTING MACHINERY AND THE LIKE
Filed Jan. 14　1921　　3 Sheets-Sheet 1
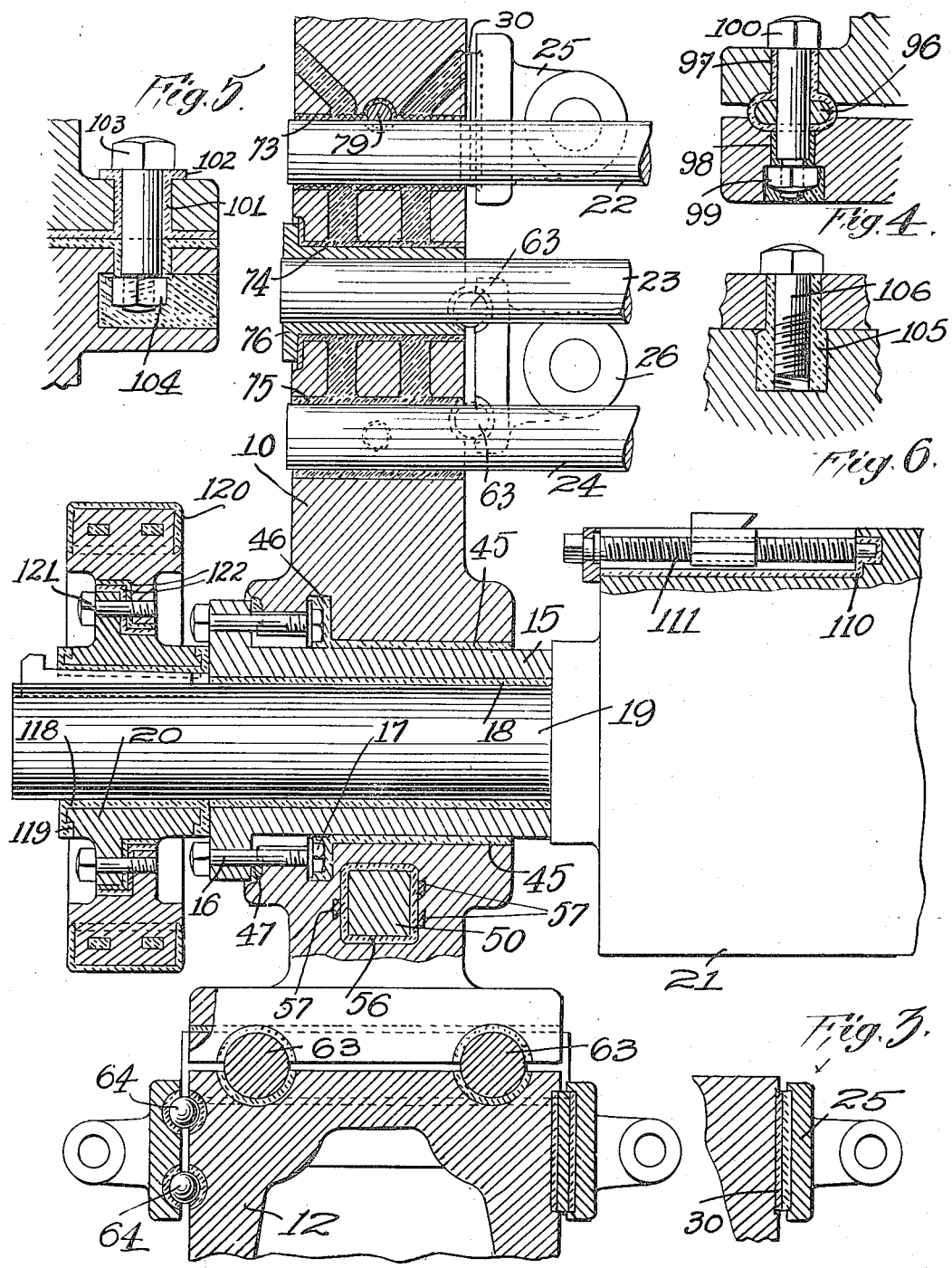

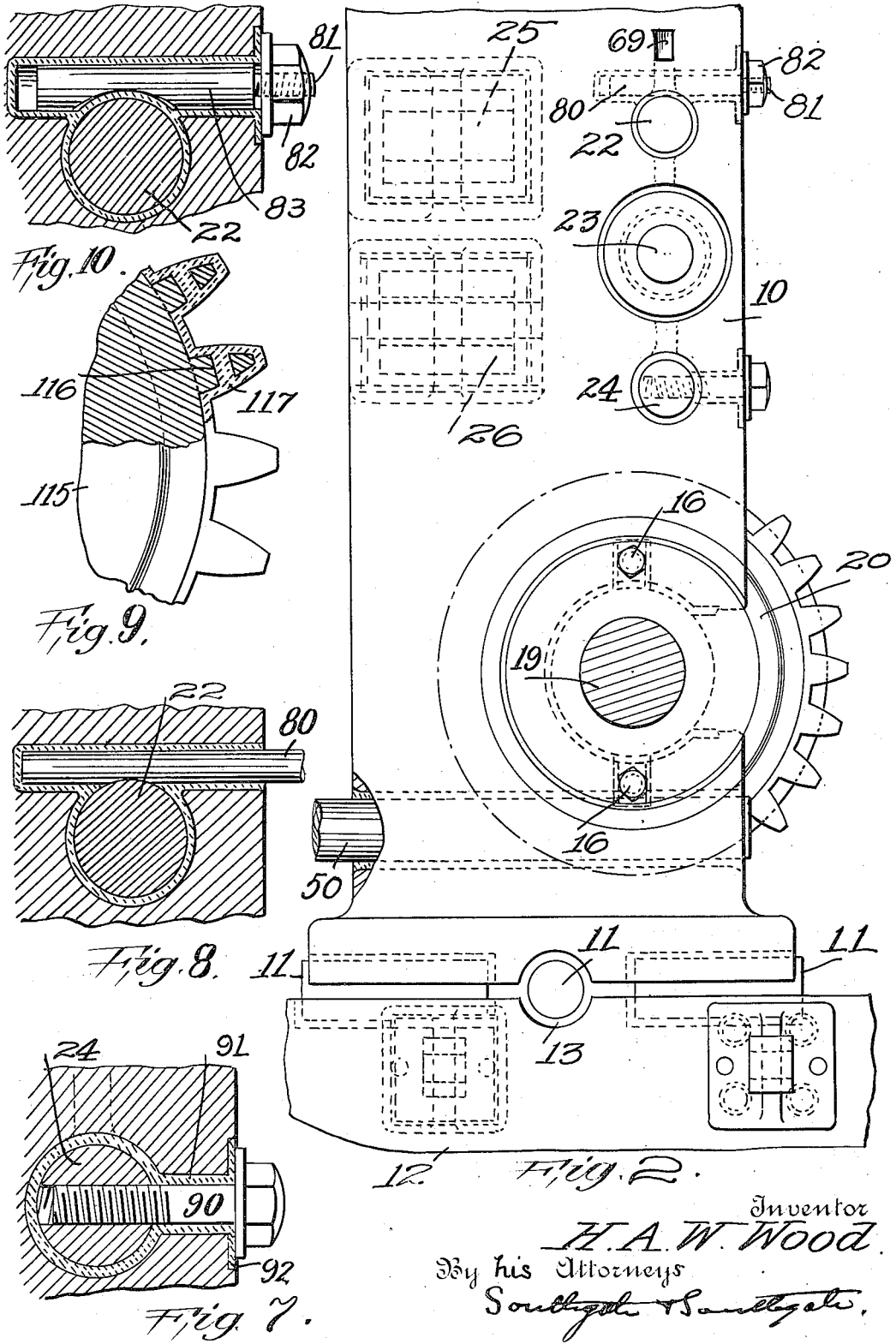

June 24, 1924.
H. A. W. WOOD
METHOD OF CONSTRUCTING MACHINERY AND THE LIKE
Filed Jan. 14, 1921    3 Sheets-Sheet 3
1,498,769
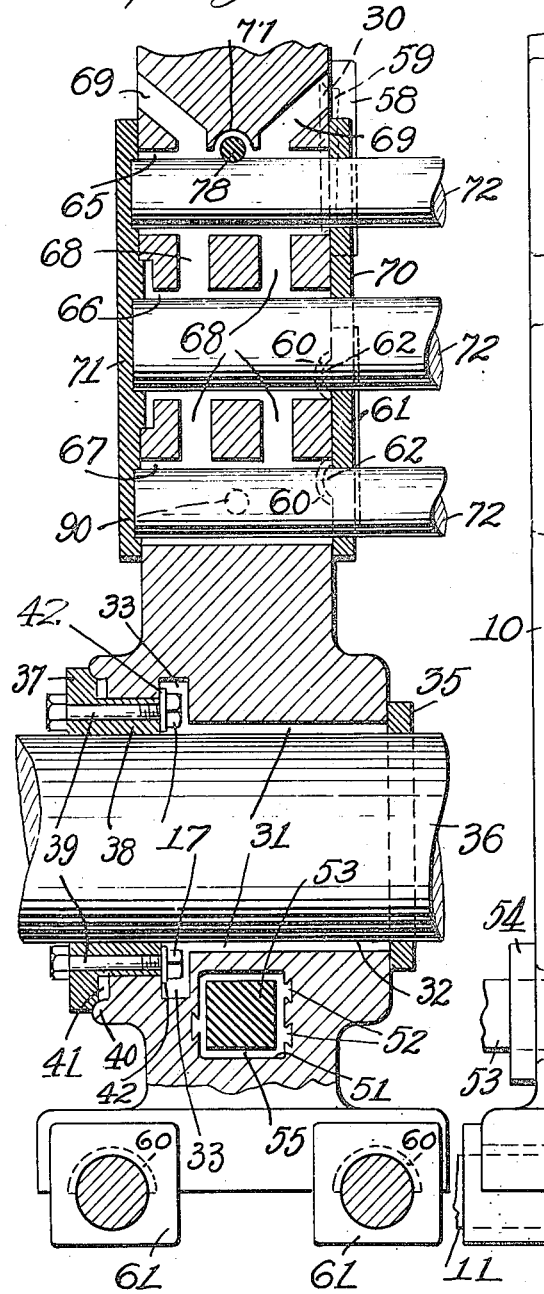
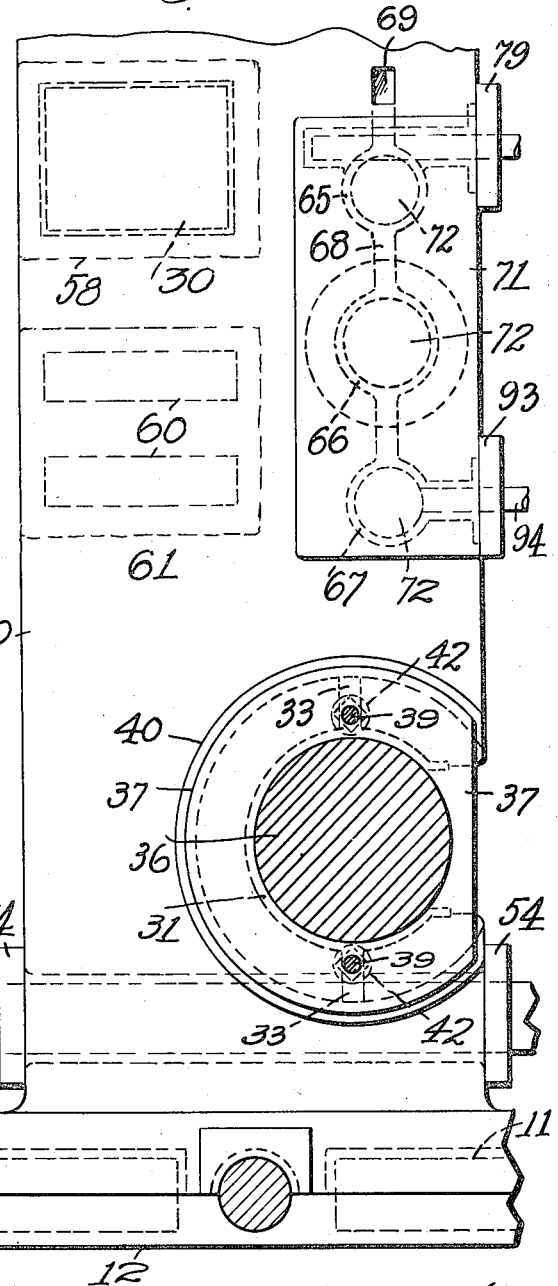
Inventor
H. A. W. Wood
By his Attorneys
Southgate & Southgate Patented June 24, 1924.

1,498,769

UNITED STATES PATENT OFFICE.

HENRY A. WISE WOOD, OF NEW YORK, N. Y.

METHOD OF CONSTRUCTING MACHINERY AND THE LIKE.

Application filed January 14, 1921. Serial No. 437,154.

*To all whom it may concern:*

Be it known that I, HENRY A. WISE WOOD, a citizen of the United States, residing at New York, in the county of New York and State of New York, have invented a new and useful Method of Constructing Machinery and the like, of which the following is a specification.

The principal object of this invention is to provide a method and means by which machine parts can be connected with each other in such a way as to avoid the necessity of resorting to the expensive, but heretofore necessary, machine tool operations for finishing the bearing or contacting surfaces. The invention involves the substitution of cast metal surfaces for the machine finished ones heretofore employed.

Reference is to be had to the accompanying drawings, in which—

Fig. 1 is a sectional view of a machine frame having the principles of this invention applied to it in various parts;

Fig. 2 is an elevation of the same;

Fig. 3 is a sectional detail showing the method of attaching a bracket to the frame in accordance with this invention;

Figs. 4 and 5 are sectional views showing the application of this method to the nut to a machine part and illustrating the connection of the bolt therefor;

Fig. 6 is a similar view showing the attachment of a screw to a large cylinder without machining in accordance with this method;

Figs. 7 and 8 and 10 are detail sectional views showing the application of this method to the locking of a shaft or rod to a frame to avoid the use of set-screws;

Fig. 9 is a sectional view of a gear constructed in accordance with this method;

Fig. 11 is a sectional view, similar to Fig. 1, showing one way of producing the result shown therein and according to this invention, and Fig. 12 is an elevation of the same similar to Fig. 2.

In machine construction it is the custom to plane upon the frame or housings of a machine the smooth surfaces to which other parts are to be affixed or on which they are to move. This operation requires the employment of a skilled planer hand and usually a heavy expensive planer occupying considerable room and consuming much power and time in its operation. After the above operation is completed the frames or housings are drilled and sometimes tapped for fitting them with shafts, or bolts or screws to secure the parts together. These operations are also open to corresponding disadvantages and they constitute a considerable proportion of the expense of a machine.

After the parts of a metal machine have been made as stated above they have to be assembled by hand. If there has been any inaccuracy in the planing, drilling, tapping, etc. much handwork has to be done by way of refitting. This is skilled labor and slow work, and adds materially to the expense.

Analysis of machine construction shows that the planing is done merely for the purpose of providing a smooth seat accurately located so as to provide the exact position for the reception of another piece or element to be secured in place or on which it is to move. It shows also that drilling is done for the purpose of providing a hole in exactly the right position and of the right size to receive a bolt, screw, or other piece that is made to fit it. Similar remarks apply to the tapping, for its object is to provide a thread for the screw to be received. As I understand this matter, proper machine design does not require any particular method of locating these plane surfaces, holes, screw-threads and other machine surfaces so long as they are accurately placed, and serve the purpose for which they are intended.

The object of this invention as stated above is to eliminate as far as possible the use of machine tools and the employment of skilled mechanics in machine construction. This saves space, the amount of power consumed by the machine tools, and the time consumed in performing their operations.

In place of these features I substitute a simple method by which surfaces, holes, threads, etc., may be provided in a finished condition and located in accurate position without the use of machine tools or skilled mechanics, and with a material saving in time.

According to my method freshly cast frames or housings, or even those made from structural shapes or of sheet metal and the members which tie them together can go down to the erecting plant the day they are received. They are immediately assembled by men who are not machinists, without ever having been subjected to machine tool work, without any form of planing, drilling or tapping. It will be understood of course that I do not limit myself to the performance of all necessary operations in accordance with my method, as it is of such a nature that it can be combined with the old methods wherever it is desirable.

In Figs. 1 and 2 I have shown a part of a machine frame with various features thereon which involve the application of this invention, and in Figs. 11 and 12 I have illustrated a way in which the frame can be cast originally and in which the surfaces are applied to it in accordance with this invention. This frame comprises a main member 10 which is shown as supported on bearing pieces 11 carried by a base 12. For convenience I will describe the latter parts only in a general way.

This base 12 is provided with cast sockets 13 or bushings for receiving the several bearing pieces 11. These are shown as cylindrical in cross section, although they may be of some other shape. They are provided with the hollow cylindrical cast sockets 13, each located partly in the base and partly in the bottom of the machine frame 10, and it is by this means that the latter is supported on the base 12.

I have shown the machine frame 10 also as provided with a box 15 fixed to it by bolts 16 entering cast-in nuts 17. This box carries a bushing 18 in which rotates a shaft 19. On this shaft is located a gear 20 and a cylinder 21 at opposite ends. The details of these elements will not be described at this point.

Also mounted on this frame are shown three rods or shafts 22, 23 and 24 respectively, and two brackets 25 and 26 which can be used for any desired purpose.

It will be understood that for connecting these various elements to the machine frame 10 it would be necessary to bore numerous holes and plane several surfaces on the frame in accordance with the present practices. I will now describe with reference to Figs. 11 and 12 how these parts can be applied without necessitating these expensive and delicate operations. It will be understood, of course, that this invention is intended to be employed mainly for quantity production.

For these purposes the frame 10, instead of being provided with more metal than necessary at the points at which the holes and bearing surfaces are to be provided, is provided with less metal at these points. In other words, in its original casting it is provided with spaces or depressions along these surfaces. Where there are flat surfaces the original casting 10 is made with spaces as 30 and where there are to be holes bored into or through the frame these holes are provided in the casting but of larger diameter and larger size in all directions than the holes or passages are to be in the finished product. Sometimes where there is a bushing or box there is material saving in the amount of original metal at this point.

In providing for the reception of the bearing box 15 the original cast frame 10 is cored out to provide a cylindrical clearance recess 31 having the rough surfaces of the casting spaced back from an imaginary cylindrical surface the size of the box. This space is to receive a material thickness of metal in the form of a hollow cylindrical lining. In coring out the casting to provide this space 31, recesses 33 are provided communicating with it for the reception of the nuts 17. As the bolts 16 are to be provided later, the recesses 33 are made with spaces extending longitudinally with respect to the box, shown in the form of enlargements in Fig. 11.

On one end of the frame 10 a mold 35 is shown having a cylindrical passage through it for a master mold member 36. This is a duplicate throughout part of its length of the box 15; that is, it has a finished cylindrical surface 32 which coincides with the cylindrical external surface of that box, but otherwise it is not necessarily similar to it. At the other end a second mold 37 is provided having a passage for the member 36 and provided with interior bosses 38 extending in as far as the recesses 33. These bosses are for the reception of master bolts or screws 39 having a diameter and a thread constituting a duplicate of the end of the bolt 16. The mold 37 is of annular form to fill the space between the member 36 and the cast interior walls of the cavity in the frame 10. It is shown as having a flange which fits against an exterior surface 40 on the frame 10. In the present case also it is shown as spaced from a part of that wall to provide an annular recess 41 for the casting of a seating ring 47 as will appear. The mold members 35, 36 and 37 are finished accurately all over their surfaces that are to receive the poured metal against them so as to provide for casting it with surfaces fully finished in the casting operation.

The parts are set in position as shown in Fig. 11. The master member 36 is put in place, and the molds 35 and 37 mounted on it and secured to the frame 10 so that this member 36 shall be located accurately in central position. I have not shown herein any particular means of fastening these molds to the frame, as this can be done by separable clamps. Each of the master bolts 39 is put in place previously and the nuts 17 secured on their ends, a washer 42 being provided preferably. These parts all being secured centrally and accurately in position, it will be understood that molten metal will be introduced into the two mold recesses 31 and 41. It can be introduced through the walls of the mold 37 or by passages in the frame 10. As I have shown a method of introducing the metal at another place in the same figure I have not illustrated any particular means in the instance now being described.

It will be understood that the cylindrical surface of the mold member 36 is finished accurately and that the interior surfaces of the molds 35 and 37 are finished out to the same diameter so that the parts fit accurately at that point. Any roughness on the exterior of the cast frame 10 can be smoothed off by a portable emery wheel so that the molds 35 and 37 will fit against smooth surfaces, if that is necessary, or packings of asbestos can be applied between the rough surface of the casting 10 and the several molds. Metal being introduced it will fill the cavities 31, 33 and 41. This hardens very quickly and then the clamps holding the molds in position can be removed and these molds withdrawn. In order to withdraw the mold 37 the master bolts 39 have to be unscrewed first which will leave the nuts 17 and their washers in position. This leaves a cast body of metal 45 having projections 46 in which the nuts 17 are imbedded. A cast packing ring 47 is intimately secured to the rough cast interior surfaces of the frame 10.

The molds and core or master mold member 36 shown in Fig. 11 being withdrawn, the box 15 can be introduced as shown in Fig. 1 and secured in position by introducing bolts 16. These will engage in the nuts 17 which are imbedded in the metal. The washers are shown in position to afford a stronger and larger surface to positively engage the iron walls of the frame 10 and hold the nuts absolutely in position.

In this box I prefer to fit the shaft 19 by the same process. This I do by casting the box with an interior passage larger than the shaft and centering in it a master core of the same size as the shaft and applying molds at the end (not shown). Then a permanent full cylindrical bushing 18 is cast and the shaft 19 introduced.

The metal which I prefer to use is antimonial lead, an alloy of lead and antimony. It melts between 500 and 600 degrees F., consequently it may be poured at a low temperature and it cools almost instantly. With a fixed permanent bushing or lining of this material cast in the manner set forth, the frame will be ready for the application of the box within a few minutes after pouring. I do not wish to be limited to this particular alloy, as others of course can be used.

I have not illustrated every feature which I desire to employ in connection with the instance just described but have shown additional features at other points on this frame. For example, a material advantage of this invention lies in the fact that non-circular rods can be introduced which would be useful for many purposes if they could be set in position. Under the present circumstances round rods are always used as it is comparatively easy to make a round hole. If square holes could be made easily, square or other non-circular rods and studs would be employed in many places.

In these figures I have shown a square rod or bar 50 introduced into the frame and projecting from it. For this purpose the frame is cast with a square passage 51 therethrough, and I have illustrated this as provided with dove-tail recesses 52. I prepare for the casting by introducing a master bar 53 which I have shown as square and of the same shape and size, of course, as the bar 50 to be introduced. This is inserted in a pair of molds 54 located in contact with the opposite sides of the frame 10 and centered in position. These parts are clamped in place.

It will be seen that there is a recess 55 around the master bar 53 and that this space has dove-tailed extensions 52 into which the metal will run when it is poured. When the metal or alloy has been introduced and cooled it leaves a lining 56 having dove-tail projections 57 constituting anchors extending into the body of the frame 10. It will cling to the frame 10 and shrink away slightly from the master bar, so that it can be removed. It will be understood that this bar is finished all over so as to leave a finished inner surface on the lining 56. The molds 54 are also removed and the bar 50 is inserted without effort and without necessitating any machine operation. This bar can be anchored in place if desired, but I have not shown this feature at this point as I have illustrated it in other connection in the same figures and that I think is sufficient.

Above I have mentioned the employment of a flat depression 30 in the surface of the frame 10 for the application of a flat member, as for example, a bracket 25. This depression is shown as dove-tailed at its edges to insure the clinging of the soft alloy to the frame when cast. All that is required in order to provide the flat surfaced seat desired is to apply a mold 58 having a recess 59. This recess is machined out on its inner flat surface so as to provide a smooth and accurate flat seat or "planing spot" as it would be called if made in the old way. Now the metal is poured into the mold 58. This fills the two recesses 30 and 59 and when the mold 58 is removed leaves a projecting "planing spot" or seat having an accurate flat finished surface.

Although not illustrated in detail, I prefer to treat the adjacent surface of the bracket 25 in just the same way and thus provide two accurate finished seats without finishing the castings at all. These two surfaces are placed in contact as shown in Fig. 1 and the bracket fixed to the frame in any desired way, not shown.

Just below this point in Fig. 11 I have shown another way of securing a bracket as 26 to the frame. In this case recesses 60 in the face of the frame 10 are shown as two in number and as mere concave depressions. The mold 61 is provided with smaller convex projections 62 corresponding to the master mold members above mentioned. Its surface otherwise fits the exterior surface of the cast frame 10. Two castings are made here by filling the spaces produced between the walls of these projections and the walls of the recesses. The bracket 26 is treated in the same way and then cylinders 63 or balls 64 are provided to accurately locate the bracket in position. This bracket also is secured to the frame in some such way as will be described later in connection with some other elements. These parts are shown as substantially duplicated at the bottom of Fig. 1.

In connection with the location of the two rods 22 and 24 and the shaft 23 I have illustrated a method of leading the alloy or metal to the same through the body of the frame 10 itself. This method can be used also in most of the other cases shown. For this purpose the frame is cored out in its original casting to produce three cylindrical recesses 65, 66 and 67 communicating with each other through sprue holes 68. This can be accomplished easily in this instance as they happen to be located one over the other. The metal is poured in at the top through gates 69, two of which are shown, thus permitting of properly venting the mold. The mold is completed by two mold members 70 and 71 on opposite sides of the frame and by master mold members or cores 72 fitting in perforations in one of the mold members and recesses in the other and thereby properly centered.

It will be seen in this case that the sprue and gate openings are located in the frame so that the metal poured into them remains in position. These parts constitute means for effectively holding the cast linings 73, 74 and 75. Therefore no other means, such as the dove-tail recesses 52, need be employed.

In addition to these elements it is to be noted that one of the linings 74 does not fit the member 23 because that, instead of being a stationary rod like the others, is a rotary shaft. This lining therefore is provided with means for holding a bushing or box 76 in which the shaft fits.

For the purpose of holding the rod 22 in position I have provided a notch in the side of the core 72 and a recess 77 in the wall of the frame. In the recess I have located a transverse master member or core 78 with the end of the recess thus produced sealed by a mold 79. The recess around this master core 78 obviously communicates with the other recesses and is filled with the alloy in the same way. It will be observed that this core 78 fits into the notch in the top of the master core 72. Consequently it has to be withdrawn before that can be. After the casting is finished and these rods are removed the rod 22 is inserted. This has a notch in one surface which is brought into proper position and then a pin, as 80, shown more fully in Fig. 8 is introduced. This holds the rod 22 against being withdrawn and constitutes a positive means for anchoring it in position.

I have shown the rod 24 as anchored in position by means of a bolt 90. I have illustrated it also in Fig. 7 as being positioned in accordance with the principles of this invention as set forth above. In other words the body of metal or alloy which surrounds the rod 24 also is provided with a hollow tubular passage surrounding the bolt. This has a flat flange or seat 92 under the washer with which the nut is provided. A mold 93 is shown in Fig. 12 constituting the end wall when the metal is cast. It will be understood of course that a master or duplicate threaded rod 94 is employed when the casting is made and that it is withdrawn and the bolt 90 applied after the rod 24 is inserted.

I have shown several other ways also of securing two bodies together. Figs. 4, 5 and 6 illustrate three different ways of securing two flat surfaced bodies to each other. In Fig. 4 the two elements which are to be united are spaced from each other and in place of casting flat seats on them like that shown in Fig. 3, I introduce a permanent iron or steel ring 96. I cast a body of metal or alloy 97 all around this ring and around the master bolt in one of the elements and projecting into the other. Then a second body of metal or alloy 98 is cast around the other end of the master bolt and the permanent nut 99. Then the master bolt is withdrawn and the permanent bolt 100 applied. I have not illustrated the molds for this as it is thought that the procedure will be obvious in view of the other figures.

In Fig. 5 I have modified the arrangement by casting a single body of metal or alloy 101 around the master bolt and along the flat side of one of the elements. This also is shown as having an integral flange or seat 102 against the finished cast surface of which the permanent bolt head 103 engages. The nut 104 is cast in place in substantially the same way as in Fig. 4 except that the cast metal or alloy comes in from the side instead of the end. A similar flat seat is cast on the other element fitting the alloy metal seat on the face described.

In Fig. 6 two elements are united by casting a single body of alloy or metal 105 all the way through one of them and into a recess in the other adapted to receive the permanent bolt 106 in its screw threaded interior. This accurately holds the parts in position as the head of the bolt prevents the detachment of the outer element from the other one.

I have also shown in Fig. 1 the provision of a cast lining 110 with a finished cylindrical recess in it for receiving the end of the clamp screw 111 of the printing plate cylinder 21. This shows merely another way of employing this process.

Another application of this method is in machine gears and gear teeth. For this purpose I provide a gear blank 115 or frame of cast steel, for example. This is cast with the teeth undersized and preferably having holes 116 or indentations cast in them for anchoring purposes. This gear blank is then placed in a metal mold, not shown, but made with its interior surfaces of the proper size for the gear and its teeth and accurately finished. Then a metal or alloy, such as antimonial lead, bronze, or the like, is poured about the gear to form a coating 117. As the interior surface of the mold is finished all over, the exterior surface of the gear teeth will come out of the metal finished. The bore of the gear can be made at the same time by placing a master stud like 19 through the center. This is of the same size as the final bore. The hub of the gear is originally cast with a pocket through it of a larger diameter so as to permit of the casting of a lining 118. This, preferably, is anchored to the blank by projecting under-cut flanges 119. The sides of the gear can be kept coated with the same metal in accordance with the same principle as shown at 120. Thus the whole gear presents a smooth finished workman-like appearance. It is strong and accurate and all the casting operations can be performed at once, if desired, so that when the master molds are once made the gear can be produced in a very inexpensive way. This gear possesses the inherent strength of steel with the good wearing qualities of the alloy or metal with which it is covered. It can be made if desired wholly without the use of a machine tool of any kind thus eliminating the expense of gear cutting processes.

I have also shown this gear as formed in two parts with the hub united to the rim by bolts 121 and the two parts connected by two layers or seats of metal alloy 122 each having a finished surface engaging the other and produced in the act of casting in accordance with the processes hereinbefore described.

It is my purpose to make a mold and use it in such a manner at a single operation that all the necessary surfaces, finished holes, and threaded holes of the frame to which it is applied shall be formed at a single pouring. These surfaces are so completely finished in the casting operation that when the molds are removed from the element to which these surfaces are applied, the element can be assembled immediately in its machine. Although it is my purpose to do this, it is also my purpose, upon occasion, to assemble the parts of the machine in proper holding devices and, after they are fixed in correct position, pour the necessary seats, linings, and other surfaces. In other words, instead of applying the desired bearing or supporting surfaces to each individual element separately and then butting them against each other, I can, in some instances, make a single casting entering two or more elements and uniting them together in an integral manner without necessitating any fitting or even locking operations afterwards. One instance of this is shown in Fig. 6.

I am aware of the fact that bushings suspended in cylindrical boxes have been made by pouring semi-cylindrical parts of metal about the shafts. But in that case the uniting metal or alloy is not capable of surrounding and forming the entire surface or one element or of connecting the two elements in permanent position. It is put in for wearing purposes and intended to be taken out and replaced at intervals by new bearing pieces. My process is not designed for any temporary purpose but it provides permanent united surfaces by which the setting up of the machinery is greatly facilitated under certain circumstances as explained above. Wherever I have referred to the frame or blanks, to which this invention is applied as a casting, it is to be understood that a sheet metal frame work or skeleton made of structural iron or steel shape can be substituted within this invention. Sometimes important economies can be secured in that way.

Although I have illustrated and described a number of modifications of the invention, I am aware of the fact that I have not exhausted all the possibilities but that the invention can be carried out in numerous other forms without departing from the scope thereof as expressed in the accompanying claims. Therefore, I do not wish to be limited to any or all of the specific embodiments of the invention herein shown and described but what I do claim is:—

1. The method of machine construction without machining which consists in casting a machine frame in a form in which, instead of having a surplus of metal at its finished surfaces, there will be a deficiency of metal along the surfaces that require fitting to other elements, providing a master member having a finished surface in the relative location of any element to be fitted to said casting, locating such master member accurately in the position to be occupied by said element, casting in permanent position between the surfaces of said casting and said master member or members a durable metal or alloy that is of sufficient hardness and strength to sustain the stresses and strains to which the machine is designed to be subjected, removing the master member, and permanently locating the corresponding element in place of the same in intimate contact with the surfaces of said cast metal or alloy.

2. The method of constructing machinery and the like which consists in forming a frame or other part with depressed surfaces and with clearance between such surfaces and the positions of any surfaces which would be required to be finished to fit them to other elements co-operating therewith, locating master members accurately in such positions that their surfaces coincide with said positions of the finished surfaces, casting a hard, strong alloy or metal, in fixed position in said clearance spaces to form permanent finished surfaces against said master members, anchoring the applied metal finished surfaces in permanent position, and replacing said master members with the elements which they represent.

3. The method of fitting two elements together without machining them, which consists in preparing a duplicate of the surface to be fitted of one of them and casting the other with a rough surface having a clearance between said rough surface and the area along which it is to contact with the first element, providing said rough surface with undercut recesses in the original process of casting, placing said duplicate in said clearance space accurately in the position to be occupied by the corresponding element, casting a hard durable alloy against the surface of said duplicate, removing the duplicate, providing a finished cast surface on the first element in the same way and applying it to the cast surface on the other element.

4. The method of mounting a bearing box accurately in a machine frame without machining the frame, which consists in forming the frame with a recess therein larger than the bearing box, centering within said recess in accurate position a master mold member having a finished exterior surface constituting a substantial duplicate of the exterior surface of the bearing box, providing means fitting the opposite sides of said frame and the walls of said master member to prevent the escape of metal between them, and casting a body of metal in said recess substantially around the master member to leave a finished surface for receiving and fitting the surface of said box.

5. The method of mounting a bearing box in a machine frame which consists in forming the frame with a recess therein larger than the bearing box, centering within said recess a master mold member having a finished exterior surface constituting a substantial duplicate of the exterior surface of the bearing box, providing means fitting the opposite sides of said frame and the walls of said master member to prevent the escape of metal between them, providing recesses in said frame communicating with the first named recess, locating threaded nuts in the last named recesses by means of master bolts, casting a single body of metal in said recesses imbedding said nuts and extending around the master member to leave a finished surface for receiving and fitting the surface of said box, withdrawing said master bolts to leave the threaded nuts in position, and when the box is in position securing it there by means of bolts passing through the box and into said nuts.

6. The method of mounting a shaft in a machine frame which consists in forming the frame with a recess, centering within said recess a master mold member having a finished exterior surface, constituting a duplicate of the exterior surface of a bearing box for said shaft, providing means fitting the opposite sides of said frame and the walls of said master member to prevent the flow of metal between them, casting a lining of metal in said recess substantially all around the master member to leave a finished surface for receiving and fitting the surface of said box, removing the master member, placing a bearing box for said shaft in said lining, said box having an interior surface larger than the shaft which it is to receive, placing a master core member having the diameter of said shaft centrally in said box, and casting a lining entirely surrounding the master core member on the interior of said box, thus furnishing a finished surface for receiving the shaft.

7. The method of mounting a bar or rod in a frame without boring out or machining the frame, which consists in producing a frame with a passage therein of substantially the same shape as said bar or rod in cross section but of larger area, locating centrally in said space a duplicate of said bar or rod and holding it accurately in position, said frame having undercut recesses extending from the first named recess, casting metal or alloy between said duplicate and the rough surfaces of said recess to form a body of metal surrounding said duplicate in the frame and anchored to the frame by integral projections in said undercut recesses and having an inner surface finished in the casting operation to fit said duplicate, then withdrawing the duplicate and replacing it with the bar or rod.

8. The method of mounting a bar or rod in a frame which consists in producing a frame with a passage therein of substantially the same shape as said bar or rod in cross section but of larger area, locating centrally in said space a duplicate of said bar or rod and holding it accurately in position, said frame having undercut recesses extending from the first named recess, casting metal or alloy between said duplicate and the rough surfaces of said recess to form a body of metal surrounding said duplicate in the frame and anchored to the frame by integral projections and having an inner surface finished in the casting operation to fit said duplicate, then withdrawing the duplicate and replacing it with the bar or rod, providing an anchoring member extending from the bar or rod and surrounding it with a body of cast metal integral with the metal surrounding the bar or rod.

9. The method of securing two elements together without machining their contacting surfaces which consists in spacing their adjacent surfaces from each other, providing a recess in one of them, locating a threaded nut in said recess, providing a master bolt extending transversely through their contacting surfaces and holding said nut, and casting two bodies of metal occupying a portion of the space between the two elements and surrounding the said bolt and one of them surrounding said nut, and replacing the master bolt by a permanent threaded bolt.

10. The method of uniting two elements which consists in providing a recess in one of them and a passage through the other of smaller size adapted to register with the first named recess, then inserting a master screw through the passage and into the recess, casting an integral body of alloy or metal into said space and recess around said screw, withdrawing the screw and replacing it by a duplicate, whereby there is produced a single body of alloy or metal extending through the recess and filling said space with a screw therein for holding the two elements together.

11. The method of uniting two elements which consists in providing each of them with an anchoring surface in position to register with the anchoring surface of the other, casting on each of said surfaces separately a layer of metal or alloy having an exterior surface of suitable form for engaging the corresponding surface of the other, and securing said surfaces in contact.

12. The method of making a gear which consists in casting a blank with teeth having their exterior surfaces all located below the surfaces which are intended for bearing against another gear, and casting bearing surfaces thereon in a mold and in an integral body substantially surrounding the gear blank and surrounding the teeth thereof.

13. The method of machine construction without machining which consists in facing with a soft metal the adjacent surfaces of two parts which are to be fixedly secured together, the soft metal making up the proper distance which should separate said parts.

14. The method of machine construction without machining which consists in facing with a soft metal adjacent substantially flat surfaces of two parts that are to be secured permanently together, the thickness of the softer metal occupying the entire space between the actual surfaces of said parts when fixedly secured together.

15. The method of machine construction which consists in assembling a group of machine elements in positions which they are to occupy in the finished machine, with spaces between their contiguous surfaces, which spaces are adapted to hold molten metal, filling said spaces with molten metal and securing the machine elements and the metal cast in said spaces permanently together.

16. The method of mounting a bar or rod in a frame without boring out or machining the frame, which consists in producing a frame with a recess therein suitable to the purpose of holding a bar or rod therein, locating centrally in said recess a substantial duplicate of said bar or rod and holding it accurately in position, casting metal between said duplicate and the surfaces of said recess to form a body of metal surrounding said duplicate in the frame and withdrawing the duplicate and replacing it with the bar or rod.

In testimony whereof I have hereunto affixed my signature.

HENRY A. WISE WOOD.